United States Patent [19]
Bildfell

[11] 3,731,969
[45] May 8, 1973

[54] AERODYNAMIC DEFLECTOR

[75] Inventor: Johann T. Bildfell, London, Ontario, Canada

[73] Assignee: Trail-Air Scoop Limited

[22] Filed: May 12, 1971

[21] Appl. No.: 142,467

[30] Foreign Application Priority Data

Nov. 16, 1970 Canada..................................098171

[52] U.S. Cl...................................296/1 S, 280/400
[51] Int. Cl. ..............................................B62d 35/00
[58] Field of Search.............................296/1 S, 91; 105/2 A

[56] References Cited

UNITED STATES PATENTS

| | | | |
|---|---|---|---|
| 3,348,873 | 10/1967 | Saunders | 296/1 S |
| 2,036,560 | 4/1936 | Backus | 296/1 S |
| 3,484,130 | 12/1969 | Read | 296/1 S |
| 2,122,422 | 7/1938 | Huet | 105/2 A |
| 3,241,876 | 3/1966 | Saunders | 296/1 S |
| 3,309,131 | 3/1967 | Saunders | 296/1 S |
| 3,415,566 | 12/1968 | Kerrigan | 296/1 S |

Primary Examiner—Leo Friaglia
Assistant Examiner—John A. Pekar
Attorney—Philip T. Mitches

[57] ABSTRACT

An aerodynamic body for disposition on the roof of an automobile is disclosed. The body is essentially wedge shaped with side skirts and having a curved rising surface for causing the wind to flow over and around a trailer being pulled by the automobile to thereby reduce the wind drag on the trailer and improve trailer tracking during travel.

10 Claims, 8 Drawing Figures

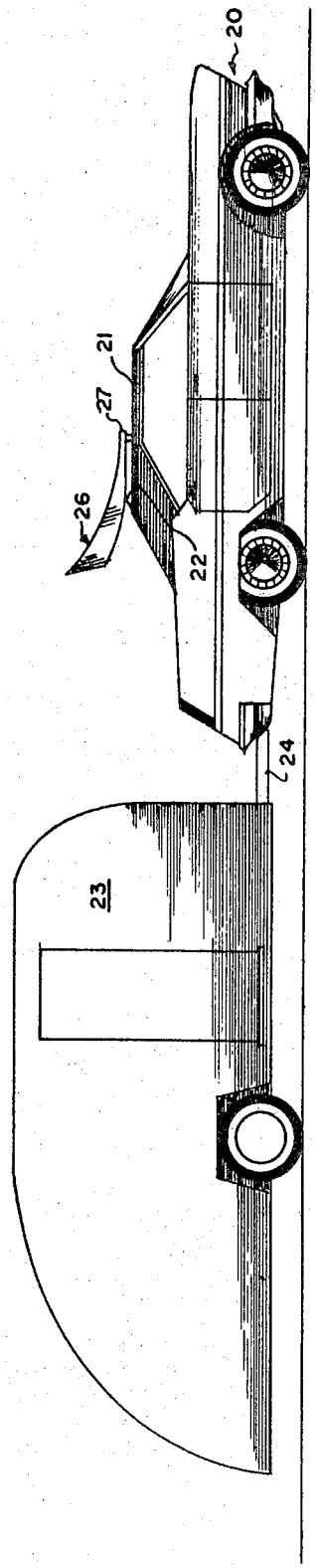
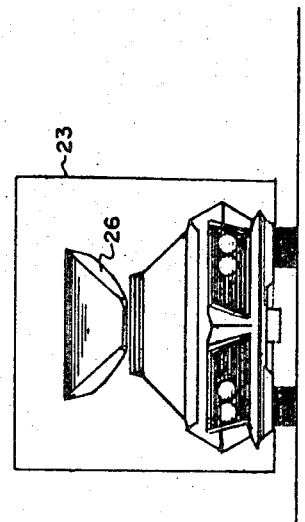
FIG 1
FIG 2

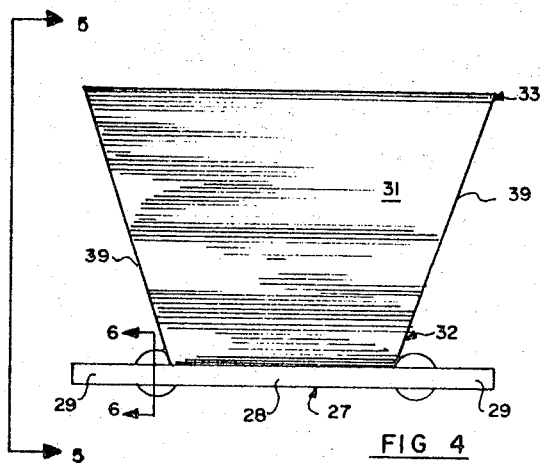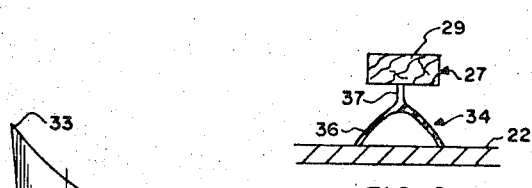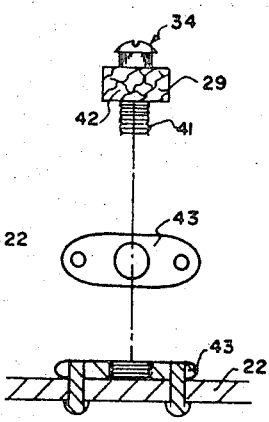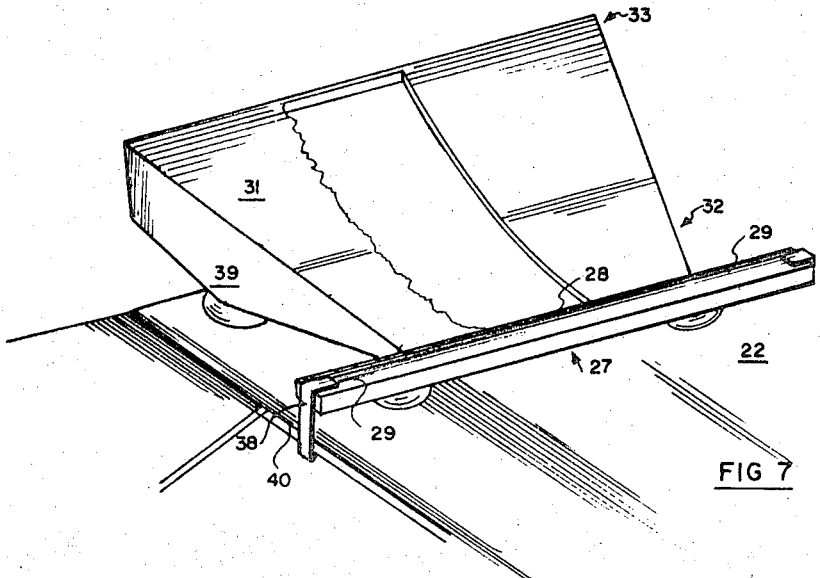

AERODYNAMIC DEFLECTOR

The invention relates to devices for deflecting air streams striking moving vehicles, particularly devices for deflecting, from a trailing vehicle and the like, air streams caused by the wind or forward movement of a first prime mover vehicle moving ahead and in front of said trailing vehicle.

By way of introduction, when a first vehicle such as an automobile travles at average to high speeds on a highway, road and the like, and pulls a trailing vehicle, such as a caravan, mobile home, housetrailer, wagon or the like high wind resistance, wind drag, imposed upon the trailing vehicle because of the medium to high speed of travel thereof, usually causes the trailing vehicle to sway from side to side. During such action, sympathetic vibrations may be induced causing more violent reciprocal swaying than tolerable or even desirable.

The invention achieves a reduction of wind drag forces on a trailing vehicle and hence the reduction of "to and fro" instability of a trailing vehicle when pulled by a first advancing vehicle. Particularly, the invention achieves an aerodynamic deflecting device disposed a pre-determined distance from the trailing vehicle such that wind is deflected by the deflector around as well as up and over the trailing vehicle to thereby reduce wind drag and to and fro action on the trailing vehicle caused by severe wind resistance.

Although the aerodynamic body (deflector) can be used with beneficial results with any size trailing vehicle which is pulled by a powered vehicle (prime mover vehicle), the aerodynamic body is particularly beneficial when the height of the caravan is greater than the height of the prime mover vehicle, particularly by about one and one-half the height of the prime mover vehicle.

The invention therefore contemplates an aerodynamic body for mounting on the top of a prime mover vehicle when pulling a trailing vehicle comprising a deflection member having an aerodynamic striking surface, an upper portion and a lower portion thereof, the lower portion thereof connected to a leading edge member, said body having means thereon for connecting the same, in near proximity, to the top of the prime mover vehicle, such that the leading edge is adapted to be disposed at right angles to the angle incidence of the prime mover vehicle, the upper portion disposed a predetermined distance from the top and down stream from the leading edge such that the deflector member disposes the aerodynamic surface, in one plane, at right angles to the angle of the attack causing wind to strike the surface and deflect it upward and away from the prime mover vehicle.

The invention will now be described by way of example, reference being had to the accompanying drawings in which:

FIG. 1 is a side view of an embodiment of the aerodynamic body when mounted on the top of an automobile pulling a trailer.

FIG. 2 is the front view of the embodiment of FIG. 1.

FIG. 4 is a plan view of the aerodynamic body of FIG. 1.

FIG. 5 is a section along lines 5—5 of FIG. 4.

FIG. 6 is a section along lines 6—6 of FIG. 4.

FIG. 7 is a perspective of an embodiment of the aerodynamic body mounted on the roof.

FIG. 8 is an elevation of tying mounting member with inserted top view of a threaded securing plate used to secure the aerodynamic body to the roof.

Figure 3:
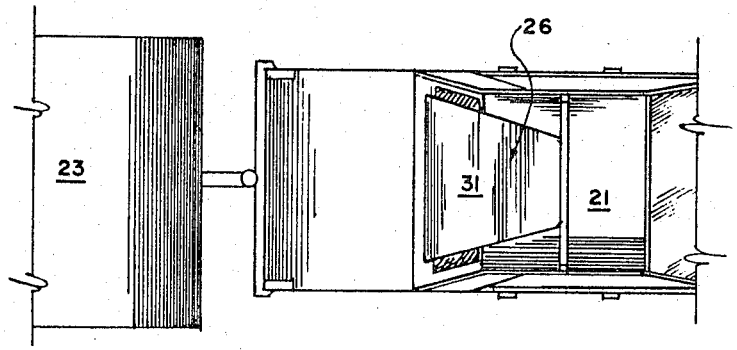
FIG. 3 is the plan view of FIG. 1.

Referring to FIG. 1 an automobile (prime mover vehicle 20), having a roof 21 with a rear roof portion 22 pulls a trailer (trailing vehicle) 23 behind it. The trailer 23 is connected by appropriate means 24 to the stern of the automobile 20.

A wind deflecting aerodynamic body 26 is mounted on the roof 21, although it is preferred to mount the body 26 on the rear roof portion 22. The aerodynamic body 26 comprises a thin and narrow leading edge member 27 with a mid portion 28 and two extremities 29 and has a concave curved aerodynamic surface 31, the expanse of which disposes a narrow lower portion 32 communicating with the mid portion 28 and a wider upper portion 33 disposed above and to the rear of the leading edge member 27 in order to display an aerodynamic scoop like body which rises from front to rear. From opposite edges of the concave curved aerodynamic surface 31, between the narrow lower portion 32 and the upper wider portion 33, are depended opposite wedge shaped skirt members 39 with apex thereof at the point of union among the mid portion 28, extremities 29, and curved aerodynamic surface 31. The mirror wedge shaped skirt members 39 are straight and have the respective surfaces disposed at right angles to the curved aerodynamic surface. Nevertheless, it would appear that satisfactory results of the aerodynamic body 26 could be achieved if the skirt members 39 traced out a locus of points of a slight concave curve.

To the under side of the leading edge member 27 and to the underside of the aerodynamic surface 31 are mounted a plurality of mounting members 34 such as suction cups 36 and suction cups with extension stems 37 for securing the areodynamic body 26 to the roof 21. Retaining straps 38, which frictionally engage the underside of longitudinally running roof gutters 40, may also be used to constrain the aerodynamic body 28 on the roof 21. The retaining straps 38 and the suction cups 36 may be used independently or co-operatively. In most applications it has been found necessary to use them co-operatively because of the magnitude of the wind drag on the aerodynamic body 26, although this may be avoided by the use of tying mounting members 34' (FIG. 8).

Tying mounting members 34' include a round head bolt portion 41 adapted to pass through an orifice 42 in the extremity 29 and thence screw into a threaded securing plate 43 secured as by rivets 44 onto the upper surface of the roof 21. In this way the leading edge member 28 s rigidly secured to the roof 21.

Referring again to the aerodynamic body 26, it is preferred that the leading edge member 27 and the concave aerodynamic surface 31 be flat and be at right angles across the line of travel of the automobile 20 and trailer 23 and displaying and increasing angle of attack from narrow lower portion 32 to wider upper portion 33. In this configuration maximum wind displacement is caused by the aerodynamic body 26 and most efficient use of its wind diverting properties achieved to cause the wind to flow (FIGS. 2 and 3) up and over the trailing vehicle 23 as well as about and along the sides of the trailing vehicle. In such configuration it is preferred that the leading edge member 27 is held in close proximity to the roof 22 for example within two inches thereof.

More particularly, the aerodynamic surface 31 preferably is a locus of points along an arc resembling a sheet conic such as a flat sheet parabola. The vertex of the parabola is coincident with the intersection of the narrow portion 32 and the leading edge member 27 and the axis of the parabola is disposed perpendicular to the line of travel of the automobile 20. Such parabolic sheet profile of the aerodynamic surface 31 ensures adequate aerodynamic properties without the requirement that the aerodynamic body 26 be of such large size to be physically cumbersome and heavy.

The areodynamic body 26 preferably has the following dimensions.

Length of leading edge member 27, 53 inches.
Thickness of leading edge member 27, 1 inch.
Cord length of aerodynamic curved surface (from upper portion 50 to lower portion 32) 32 inches.
Width of narrow lower portion 32, 28 inches.
Width of upper wider portion 33, 50 inches.
Width of skirt members 39, from 2 inches at apex to 7 ½ inches at the upper wider portion 33.
Rise of the upper portion 33 above the lower portion 32, 15 inches.

Although the embodiments of the invention have been disclosed as including a curved aerodynamic surface 31, nevertheless such surface could be a flat inclined plane which could be disposed along the core 31' of the surface 31 (see FIG. 5). It should be emphasized that the position of the aerodynamic body on the roof of the automobile is not too critical although by trial and error one will discover the ideal position of the aerodynamic body 26 on the roof in relation to the height of the trailing vehicle 23 proposed to be pulled.

The embodiments of the invention in which an exclusive property or privilege is claimed are defined as follows:

1. An aerodynamic body for mounting on the top of a prime mover vehicle when pulling a trailing vehicle wherein a thrust is exerted on the aerodynamic body by virtue of the wind resistance of the moving prime mover vehicle while it proceeds along its line of travel, said body having an (effective) angle of attack inclined in relation to the prime mover vehicle and comprising a deflection member having an aerodynamic striking surface generally curved upward and rearwardly from a lower front portion to an upward rearward portion, the lower portion connecting to a surface of a leading edge member having one side thereof perpendicular to the line of travel and means thereon for disposing the body in near proximity and above the top of the prime mover vehicle such that wind striking the surface is deflected, in the lower portions, upward and outward away from the top of the prime mover vehicle and hence over the trailing vehicle.

2. The body of claim 1 wherein the upper portion has width which is twice the width of the lower portion.

3. The body of claim 2 wherein the aerodynamic surface (is a flat inclined plane) approaches that of a plane.

4. The body of claim 2 wherein the aerodynamic surface is a concave sheet curve.

5. The body of claim 2 wherein the aerodynamic surface disposes from lower portion to upper portion an increasing angle of attack.

6. The body of claim 5 wherein the curve is one arm of a sheet parabola with vertex located at the leading edge.

7. The body of claim 5 wherein means for connecting the body to the roof includes retaining straps secured to the extremities of the leading edge member and adapted for connection to the prime mover vehicle.

8. The body of claim 7 further comprising skirt members depended from opposite edges of the aerodynamic surface between the lower narrow portion and the upper wider portion, said skirt members adapted for diverting wind about the trailing vehicle.

9. The body of claim 2 wherein means for connecting the body to the roof includes retaining straps secured to the extremities of the leading edge member and adapted for connection to the prime mover vehicle.

10. The body of claim 21 wherein the upper portion rises above the lower portion by about one-half the width of the lower portion.

* * * * *